United States Patent [19]

Johnson

[11] Patent Number: 5,056,806
[45] Date of Patent: Oct. 15, 1991

[54] TRAILER WITH AXLE

[76] Inventor: Harlan F. Johnson, R.R. 3, Box 189, Litchfield, Minn. 55355

[21] Appl. No.: 529,628

[22] Filed: May 29, 1990

[51] Int. Cl.⁵ .............................. B60P 1/00; B60P 3/00
[52] U.S. Cl. ................................... 280/143; 280/414.1; 280/656; 280/DIG. 14; 296/7
[58] Field of Search ................. 280/405.1, 406.1, 407, 280/407.1, 64, 414.1, 140, 141, 142, 143, 144, 145, 146, 147, 148, DIG. 15, 656; 296/3, 7, 8, 9

[56] References Cited

U.S. PATENT DOCUMENTS

| | | | |
|---|---|---|---|
| 1,419,160 | 6/1922 | McKinnon | 280/405.1 |
| 2,174,063 | 9/1939 | Richards | 280/405.1 |
| 2,766,053 | 10/1956 | Madruga | 280/414.1 |
| 3,413,014 | 11/1968 | Franz | 280/414.1 |

Primary Examiner—Mitchell J. Hill

[57] ABSTRACT

A trailer useful for carrying combine cutter heads - either corn or small grains. The trailer avoids interference with the combine when loading the head and also maintains a proper load balance after the head is loaded. It does so by using a trailer-wheel axle which is movable from a normal road position with the wheels well under the load to a rear position where the wheels are considerably behind the driving wheel of the combine as that machine drives up to the trailer so that the head can be detached and loaded.

3 Claims, 2 Drawing Sheets

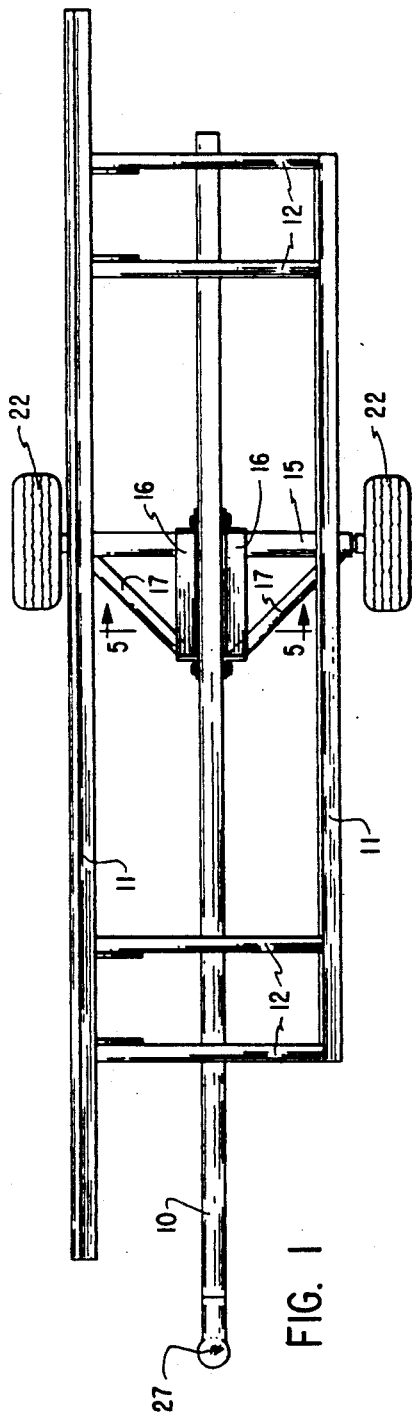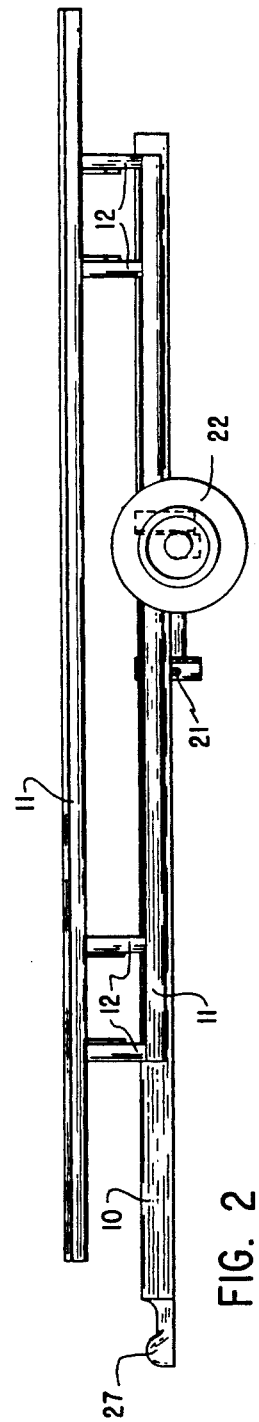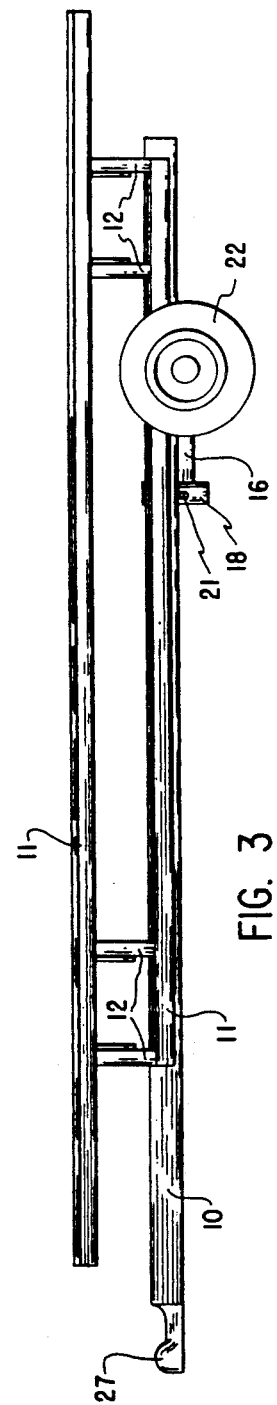

TRAILER WITH AXLE

BACKGROUND AND SUMMARY OF THE INVENTION

This invention pertains to trailers and particularly to a specialized trailer for carrying a cutting head of a combine and having special features to simplify the loading and unloading of the cutting head onto the trailer.

As farm machinery has become larger to accomplish a wider band of operation, it has also become more clumsy to handle on the roads and highways. Most implements to be used in row-crop farming, and many used in other farming are now much wider than the usual width limits on highways. For machinery which is regularly carried on highways such as combines used in wheat fields, or used for custom harvesting of row crops, this width requires special accommodation.

Ordinarily, combines are built with removeable and replaceable cutting heads. Cutters for wheat or similar small grains are of somewhat different conformation than those used for corn or similar row crops. Therefore, the heads are made to be readily interchangeable.

This construction also simplifies transportation. Because the power and threshing unit is ordinarily about as wide as the highway limits, it can be loaded onto a tailer and carried facing its normal direction of travel. The head, being of about that dimension in a fore and aft direction can be easily carried by a trailer on which the head is loaded perpendicular to its normal direction of travel.

Loading of the head onto the trailer should be a simple task because the head is built so that it can ordinarily be lifted well above ground level by the power unit. Thus, when the combine is turned at the end of a row or when the unit is being driven from one field to another, the cutter is raised. All that is required for loading is to raise the head, drive up to the side of a properly-proportional trailer, lower the head onto the trailer, disconnect it and drive the power unit away. Unfortunately, any trailer must have a reasonable balance of its load over the axle or axles, or the trailer cannot be safely driven. To balance the load, the axle should be nearly centered under the load. This balance would appear to be no problem until it is realized that the wheel of the trailer where the trailer is balanced interferes with the combine power unit as it approaches the side of the trailer.

The solution proposed by my invention is to provide for an axle which can be moved from its normal load-carrying position to a far rear position for loading and then returned to the carrying position for hauling.

A more complete understanding of the invention may be had from a study of the following description and the figures.

BRIEF DESCRIPTION OF THE DRAWINGS

FIG. 1 is a top plan view of the trailer of my invention,

FIG. 2 is a side elevational view of the trailer with the axle in its forward and traveling position, FIG. 3 is a view similar to FIG. 2 with the axle in the loading position.

DESCRIPTION

Briefly my invention comprises a trailer especially adapted for carrying all or part of a farm implement by use of a moveable axle to allow the trailer wheels to be displaced while the implement is being loaded.

Figure 4:
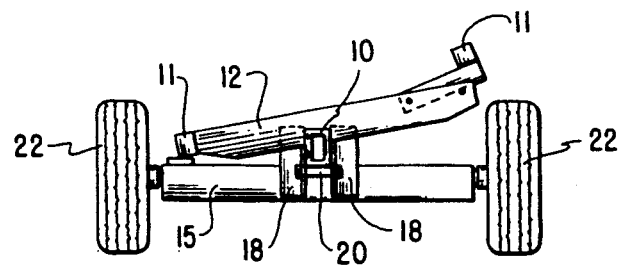
FIG. 4 is a rear elevational view of the trailer.

More specifically and with reference to the drawings, the trailer includes a frame built around a central spine 10. The frame which forms the bed of the trailer also includes side bars 11 running parallel to the spine. These bars are supported by transverse supports 12 and may be held in a tilted position as shown in FIG. 4. This tilt is desirable in order to support the cutting head of nearly all combines. However, there may be other implements which could be readily carried by the trailer when the tilted position would not be desired. Therefore, it is possible that the cross members would be pivotally attached to the spine to allow various degrees of tilt for the bed of the trailer.

Figure 5:
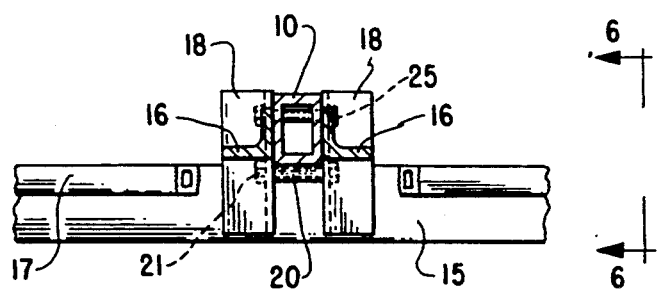
FIG. 5 is a partial sectional view from line 5—5 of FIG. 1.
Figure 6:
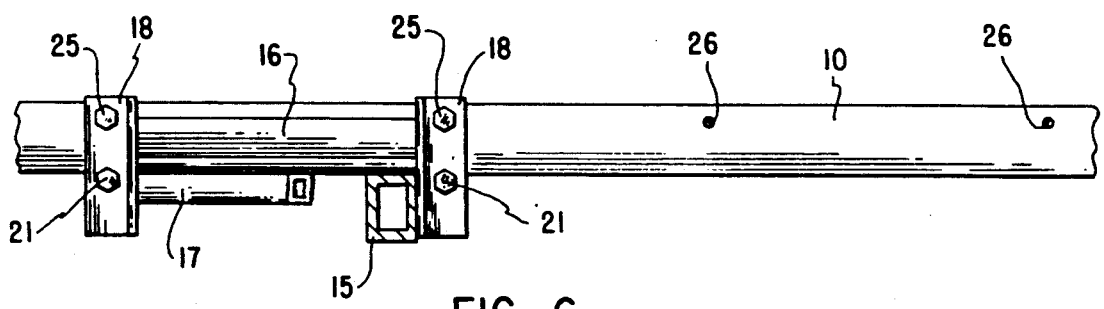
FIG. 6 is a partial sectional view from line 6—6 of FIG. 5.

The axle-carrying part of the trailer includes a separate frame including an axle member 15 running transversely to the spine 10. In order to hold the axle rigidly in place, a pair of longitudinal members 16 extend forward from the axle and are held by diagonal braces 17. At both the front end and the back of the axle carrying frame, vertical brackets 18 are firmly fixed to the axle frame to form a channel in position to embrace the spine 10. Each of these brackets carries a roller 20 (FIG. 5) running on a bolt 21 as an axle. The rollers 20 thus are in position to provide rolling engagement between the spine 10 as it lies in the channel and the brackets on the frame, thus allowing relatively easy motion of the axle carrying part relative to the spine.

The trailer is assembled by mounting the trailer bed on the axle carrying part by placing the spine 10 in its trough between the brackets 18 and above the rollers 20. Thus the spine rests on the rollers with the weight of the spine and anything above that being transmitted through the axle carrying part to the axle 15 and then to the road wheels 22 which carry the load. These wheels are shown journalled directly on the axle 15. It will be obvious that a spring type suspension could be substituted, if desired.

Because the spine 10 is now readily moveable in a longitudinal direction on the axle carrying part, some means is required to regulate that motion. The simplest device, and the preferred one, is simply to use a bolt 25 extending through holes in the brackets 18 which can be positioned to register with the holes 26 in the spine. By thus bolting the brackets 18 rigidly in position on the spine 10, the trailer parts are held in a substantially unitary state.

The use of the trailer is now obvious. Travelling on the road, the wheels are held in the position shown in FIGS. 1 and 2. The trailer, in that configuration is balanced with modest force required to support the tongue 27 which is mounted on the end of the spine 10. When an implement is to be loaded on the trailer, the front of the wheels 22 are blocked. The bolts 25 are then removed from the brackets 18 so that the spine can be moved on the rollers 20. If the towing vehicle is now carefully pulled forward, the holes in the brackets can be made to register with a more rearward hole 26 in the spine, and the bolts temporarily replaced. The trailer is now in the configuration shown in FIG. 3. In this state, a combine or loading vehicle can be moved very close to the side bars 11 near their center because the wheels 22 and their axle 15 and accompanying parts are toward the rear of the trailer, and not near the center. The implement to be carried can then be placed on the bars 11.

Before pulling the trailer on the road, the axle must again be near the center of the trailer to reduce the weight on the tongue to a reasonable load for the ordinary towing vehicle. To accomplish this, the rear of the wheels 22 is blocked and the bolts 25 again removed. The towing vehicle then is reversed pushing the spine 10 over the rollers 20 until the central location is again reached. Replacement of the bolts 25 now holds the trailer in its road traveling state.

I claim as my invention:

1. A trailer for carrying a farm implement which must be loaded from the side, said trailer comprising bed means for support of said implement including a central spine, axle carrying means movably mounted on said spine whereby said axle carrying means can be adjusted to various longitudinal positions relative to said spine, transverse rollers engaged between said spine and said axle carrying means to provide ease of movement therebetween, and means engaging both said spine and said axle carrying means to hold said spine and said axle carrying means in a fixed adjusted position.

2. The trailer of claim 1 in which said axle carrying means includes channel forming means embracing said spine to hold said axle carrying means in proper position relative to said spine.

3. The trailer of claim 2 in which said bed means includes longitudinal side bars mounted on transverse support attached to said spine, said side bars being spaced apart both vertically and horizontally to provide a bed tilted relative to said axle carrying means for the support of said implement.

* * * * *